United States Patent [19]

Sasayama

[11] 4,236,214
[45] Nov. 25, 1980

[54] IGNITION TIMING CONTROL SYSTEM FOR INTERNAL COMBUSTION ENGINE

[75] Inventor: Takao Sasayama, Hitachi, Japan

[73] Assignee: Hitachi, Ltd., Japan

[21] Appl. No.: 869,626

[22] Filed: Jan. 16, 1978

[30] Foreign Application Priority Data

Jan. 17, 1977 [JP] Japan .................................. 52-2904

[51] Int. Cl.³ ............................ F02P 5/08; F02B 5/02
[52] U.S. Cl. ..................................... 364/431; 123/417
[58] Field of Search ....................... 364/431, 424, 442; 123/117 D, 117 R

[56] References Cited

U.S. PATENT DOCUMENTS

| 3,853,103 | 12/1974 | Wahl et al. ...................... 123/117 R |
| 3,901,201 | 8/1975 | Mizuguchi et al. .............. 123/117 D |
| 3,908,616 | 9/1975 | Sasayama ........................ 123/32 EC |
| 3,909,601 | 9/1975 | Yamawaki et al. ................... 364/431 |
| 3,919,987 | 11/1975 | Haubner et al. ................. 123/117 D |
| 3,934,563 | 1/1976 | Muller ............................ 123/117 D |
| 3,939,811 | 2/1976 | Sasayama ........................ 123/117 D |
| 3,955,723 | 5/1976 | Richards ........................ 123/117 D |
| 4,015,565 | 4/1977 | Aono et al. ..................... 123/117 D |
| 4,033,305 | 7/1977 | Maioglio et al. ................ 123/117 D |
| 4,064,846 | 12/1977 | Latsch et al. ................... 123/117 D |
| 4,079,709 | 3/1978 | Schuette ......................... 123/117 D |
| 4,082,069 | 4/1978 | Mayer ............................ 123/117 D |

FOREIGN PATENT DOCUMENTS

| 2649690 | 5/1977 | Fed. Rep. of Germany ...... 123/117 D |
| 2700164 | 7/1977 | Fed. Rep. of Germany ...... 123/117 D |
| 2703575 | 8/1977 | Fed. Rep. of Germany ...... 123/117 D |
| 51-114532 | 10/1976 | Japan . |
| 1413685 | 11/1975 | United Kingdom ................. 123/117 D |

*Primary Examiner*—Felix D. Gruber
*Attorney, Agent, or Firm*—Craig & Antonelli

[57] ABSTRACT

A method and an apparatus for controlling the ignition timing for an internal combustion engine wherein whether the engine rotation is in acceleration or deceleration is detected and the magnitude of the acceleration or deceleration is detected. Each time an acceleration is detected, the ignition timing is shifted by a determined value in the same direction as that of the immediately preceding shifting, while each time a deceleration is detected, the ignition timing is shifted by a determined value in the direction reverse to that of the immediately preceding shifting, thus causing the ignition timing to approach to a situation where the engine is capable of producing its maximum torque under a given fuel supply.

16 Claims, 7 Drawing Figures

IGNITION TIMING CONTROL SYSTEM FOR INTERNAL COMBUSTION ENGINE

BACKGROUND OF THE INVENTION

The present invention relates to an ignition control system for an internal combustion engine and more in particular to a method and an apparatus for controlling the ignition timing of an internal combustion engine so as to operate the engine under the condition adapted to produce its maximum torque under a given fuel supply.

In one conventional control system, the ignition timing of the internal combustion engine has been controlled under what is called a programmed control, in which the ignition timing is controlled to meet predetermined characteristics depending on the engine operating conditions. Also, it is well known to use, as parameters for changing the ignition timing, the number of engine revolutions and the intake vacuum pressure of a fuel system. In such a control system, it would require many complicated programs if the control is to achieve an optimum ignition timing under any possible operating conditions and such a control is virtually impossible to obtain. It is also difficult to cope with the differences in engine structure and fuel properties to meet the ever-changing environmental conditions. For these reasons, the programs now employed for such purposes are limited to simple ones only using main parameters of operating conditions.

As a result, the engine may be operated at an ignition timing far from the optimum ignition timing, so that fuel consumption is unsatisfactory. In order to solve this problem, it has been suggested that more complicated programs be stored in a digital memory and selectively read out in accordance with the parameters of the operating conditions for controlling the ignition timing. Such a system, in spite of its advantage of high control accuracy, would be high in cost if it should be applicable to all possible situations. Another disadvantage of that system is the inability thereof to cope with the above-mentioned variations of fuel, environmental conditions and engine mechanisms or changes thereof with the lapse of time.

Another method for adjusting the ignition time wherein the fact that knocking or abnormal sound of an engine occurs due to an improper ignition timing is taken into consideration and is disclosed in the Japanese Patent Application No. 25511/76, published for public inspection on Oct. 8, 1976. This method, however, has disadvantages in that the ignition timing control is adversely affected by the surrounding noises, thus making it difficult to correct slight displacement from the optimum point of ignition timing.

SUMMARY OF THE INVENTION

The present invention is based on the principle that in an internal combustion engine, the change of ignition timing causes the torque generated and the engine revolutions to change and the engine revolutions are increased as the actual ignition timing approaches the optimum timing. Accordingly, after advancing or delaying the ignition timing by a predetermined amount during engine operation, the increase and decrease in engine revolutions indicate that the ignition timing has approached and gone away from the optimum timing, respectively. When such changes in ignition timing are repeated, and each time of such changes, whether the ignition timing is approaching or going away from the optimum timing is detected from the changes in engine revolutions, and if the ignition timing is found to be going away from the optimum timing, the direction of change in ignition timing is changed; that is, the advancing thereof is changed to the delaying thereof, or vice versa, while if it is detected that the ignition timing is approaching the optimum timing, on the other hand, the ignition is changed further in the same direction. In this way, the actual ignition timing may finally meet with the optimum timing.

Accordingly, it is an object of the present invention to provide a method of controlling the ignition timing for an internal combustion engine comprising steps of periodically detecting whether the engine revolutions are accelerated or decelerated during engine operation and determining the direction of change in ignition timing on the basis of the result of detection.

Another object of the invention is to provide an apparatus embodying the above-mentioned method.

The above and other objects, features and advantages will be made more apparent by the detailed description of embodiments taken in conjunction with the accompanying drawings. dr

DESCRIPTION OF THE PREFERRED EMBODIMENTS

Figure 1:
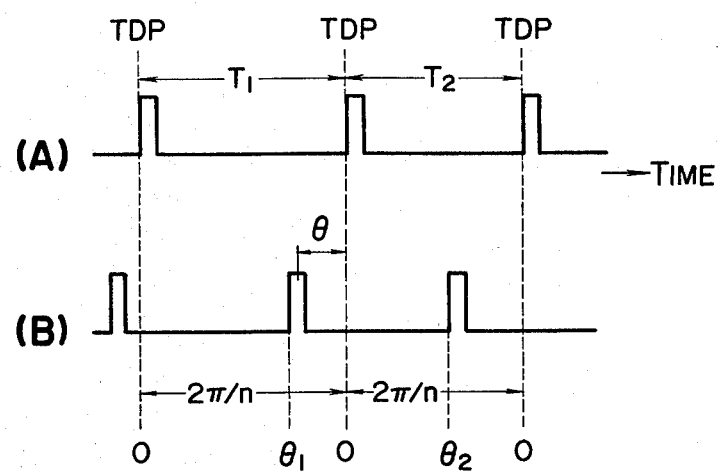
FIG. 1 (comprised of A and B) is a diagram for explaining the relation between the angular position of the engine drive shaft and ignition timing.

The diagram showing the relation between the angular position of the engine shaft and the ignition timing is shown in FIG. 1 and FIG. 1A illustrates a reference angle signal produced from a pick-up mounted on the rotating shaft of the engine, such as pulses which rise at the top dead point of each cylinder. In the drawing, n represents the number of cylinders. In the case of a four-cylinder engine, for instance, one reference angle signal is generated each angular movement of the engine shaft by $2\pi/4$ (=90°). FIG. 1B shows ignition timing signals for respective cylinders. Ignition occurs at a rise point of each signal. In the drawing, $\theta$ shows the advance in angle of ignition timing. The shifting of ignition timing in the direction of advance means the shifting thereof in such a direction as to increase the angle $\theta$, while the shifting of ignition timing in the direction of delay means the shifting thereof in such a direction as to decrease the angle $\theta$. Angle $\theta$ is adapted to change in the range between 0 and a predetermined maximum value.

Figure 2:
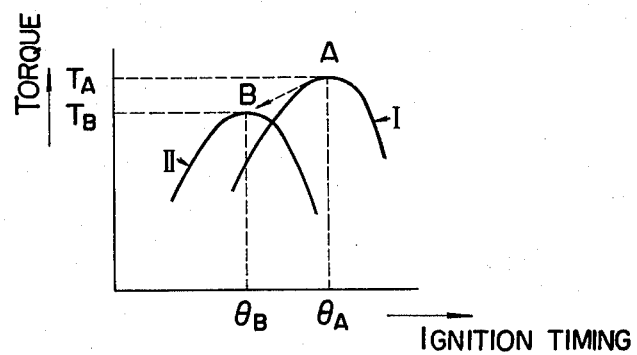
FIG. 2 is a graph showing the relation between the engine ignition timing and the torque generated.

A graph showing the relation between ignition timing of an internal combustion engine and the torque generated is shown in FIG. 2. Generally, the torque of the output shaft of an internal combustion engine takes a maximum value at the optimum ignition timing which may change depending on various operating conditions. In other words, if the ignition timing is delayed too far from the optimum timing, the piston is in downward movement far away from the top dead point when combustion is completed, thus making effective conversion of the fuel combustion to mechanical energy impossible. If the ignition timing advances too far from the optimum timing, by contrast, the internal pressure of the cylinder reaches the maximum value thereof before the piston reaches the top dead point, resulting in the internal pressure acting against the rotation of the engine, thereby reducing the output. Thus, there exists an optimum ignition timing point where the torque is maximum. With the change in operating conditions, the curve representing the relation between ignition timing and torque is changed as shown in views I and II of FIG. 2, so that the optimum ignition timing changes from $\theta_A$ to $\theta_B$. Thus, by adjusting the ignition timing in such a manner as to attain maximum torque, it is always possible to maintain the optimum mechanical efficiency.

Figure 3:
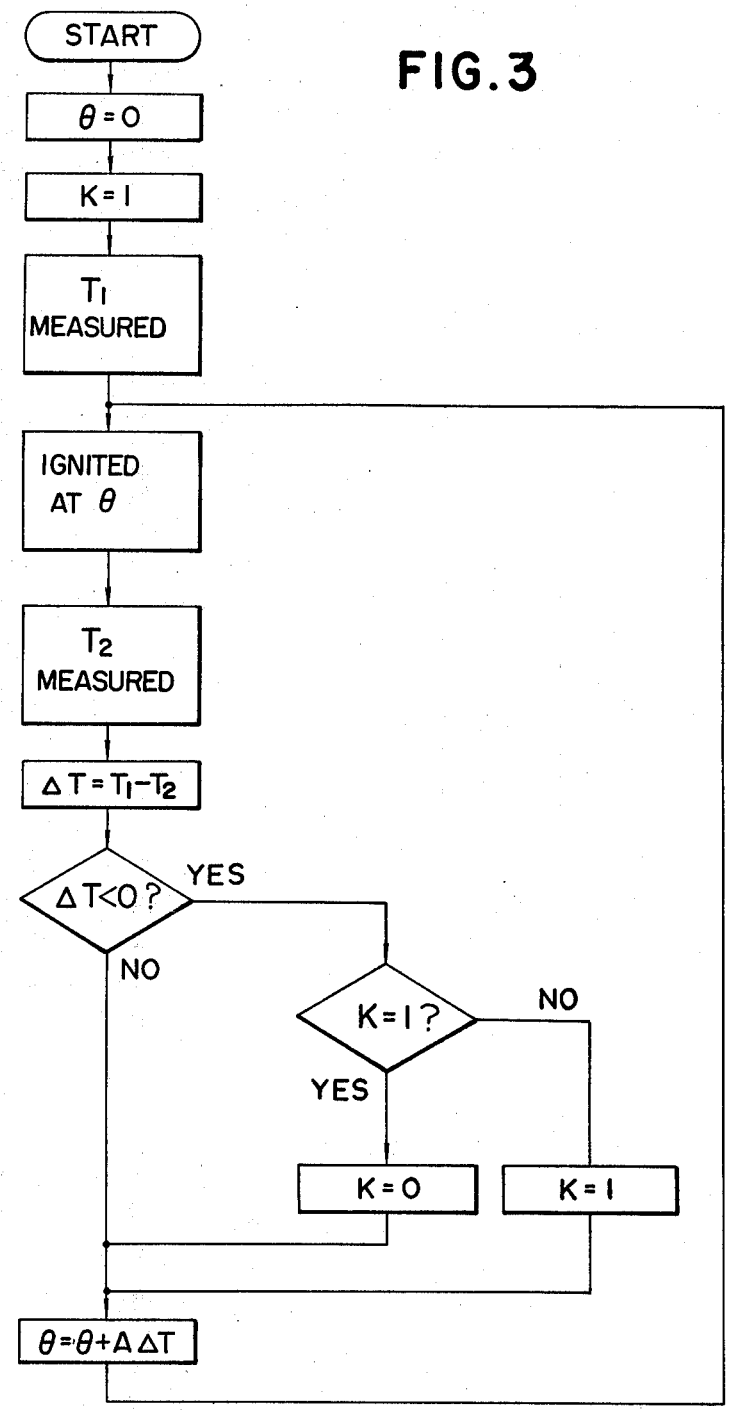
FIG. 3 is a flowchart showing the principle of the present invention.

A flowchart of operations of the apparatus according to the present invention is shown in FIG. 3. The present invention will be described in detail below with reference to FIG. 3.

At the initial state of the control before starting the engine, the ignition timing $\theta$ is set at zero corresponding to ignition at the reference angle position. The reference angle position is located substantially at or slightly before the top dead point. The control index K indicates the direction of changing the ignition timing. When K=1, the ignition timing is shifted to the direction of advance; and when K=0, it is shifted to the direction of delay. At the initial state of the control, K is set at "1". As the engine is driven, the reference angle signals are generated successively. The time interval $T_1$ between the first two successive reference angle signals is measured and a signal indicative of the time interval $T_1$ is produced after expiration of the last one of the two successive reference angle signals for comparison with the time interval $T_2$ between the second and third reference angle signals. Since the ignition timing $\theta$ is set at zero, the ignition should occur at the reference angle position where $\theta=0$ for each cylinder. At occurrence of the next reference angle signal, the time interval $T_2$ is measured, and by comparing $T_1$ with $T_2$, the difference $\Delta T$ is detected. Whether $\Delta T$ is smaller than zero or not is determined. $\Delta T$ larger than zero indicates that the engine is in an accelerated condition; while $\Delta T$ smaller than zero indicates that the engine is being decelerated. Upon detection of $\Delta T$ being not smaller than zero, the value of $\theta + A\Delta T$ is calculated, where A is a constant, and the result of this calculation is replaced for the previously set value of the ignition timing $\theta$ so as to cause the next ignition to occur at $\theta + A\Delta T$. In the first cycle after engine start, K=1 and therefore the new ignition timing point is the one leading the first ignition timing point ($\theta=0$) by $A\Delta T$. Next, by using the already-measured value $T_2$ as $T_1$ and newly measuring the time interval till generation of the next reference angle signal for $T_2$, the control repeats a control cycle similar to the preceding one. In this way, as long as the accelerated condition continues, the ignition timimg is advanced by $A\Delta T$ in each control cycle. Assuming that it is found that $\Delta T$ is smaller than zero in a given cycle, it indicates that the engine has changed to a decelerated condition. In accordance with this condition, the control takes the step as shown in the chart of FIG. 3 by "Yes" in answer to the question of whether $\Delta T$ is smaller than zero, and whether K=1 or 0 is determined. If K=1, the value K is changed to "0" so as to shift the ignition timing in the direction of delay before the step of calculation of $\theta + A\Delta T$ so that the next ignition occurs at an ignition timing point delayed by $|A\Delta T|$. In other words, when it is determined that $\Delta T$ is smaller than zero, it indicates that the ignition timing is so advanced as to be going away from the optimum ignition timing point. So, the direction in shift of the ignition timing is changed from advance to delay again toward the optimum timing point. Similarly, if it is determined that K=0, the value K is changed to "1", thus correcting the ignition timing to advance.

In the four-cylinder engine, the maximum value of $\theta$, i.e., maximum advance angle is generally set at approximately 50°, and the value A is so selected that the amount of each correction $|A\Delta T|$ is about 0.5° to 1°.

Instead of setting values K and $\theta$ at 1 and 0 respectively as explained above, K and $\theta$ may be set at 0 and $\theta_m$ (which is the maximum advance angle). Also, it will be easily understood that the same effects are achieved by making this control inoperative at the time of engine start and then becoming operative after the engine reaches a certain number of revolutions.

Figure 5:
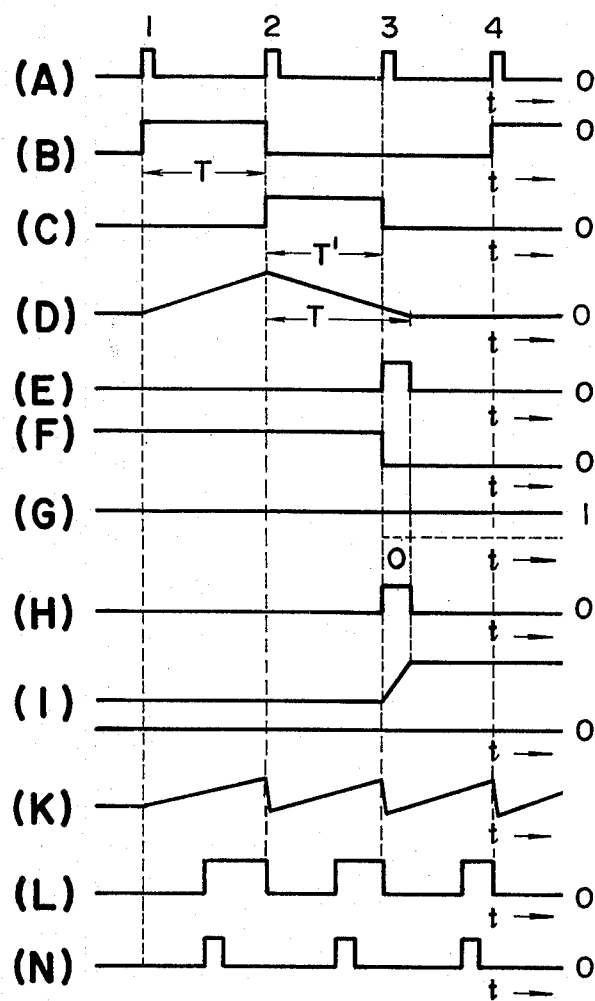
FIGS. 5 and 6 are diagrams showing waveforms of output signals produced at various points of the circuit of FIG. 4.
Figure 6:
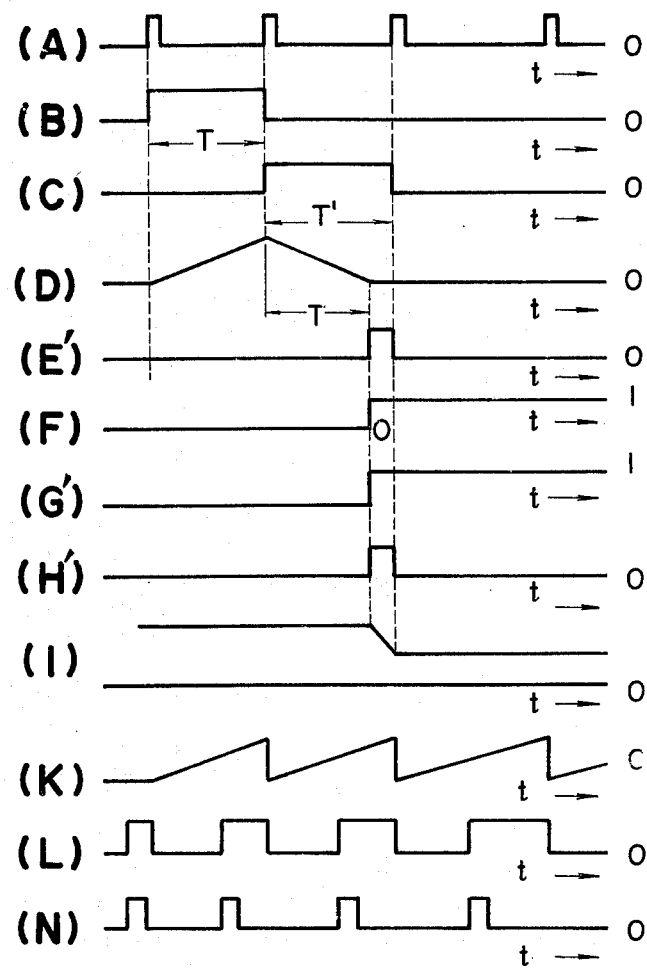

An apparatus embodying the method based on the above-mentioned principle will be described below with reference to FIGS. 4, 5 and 6.

Figure 4:
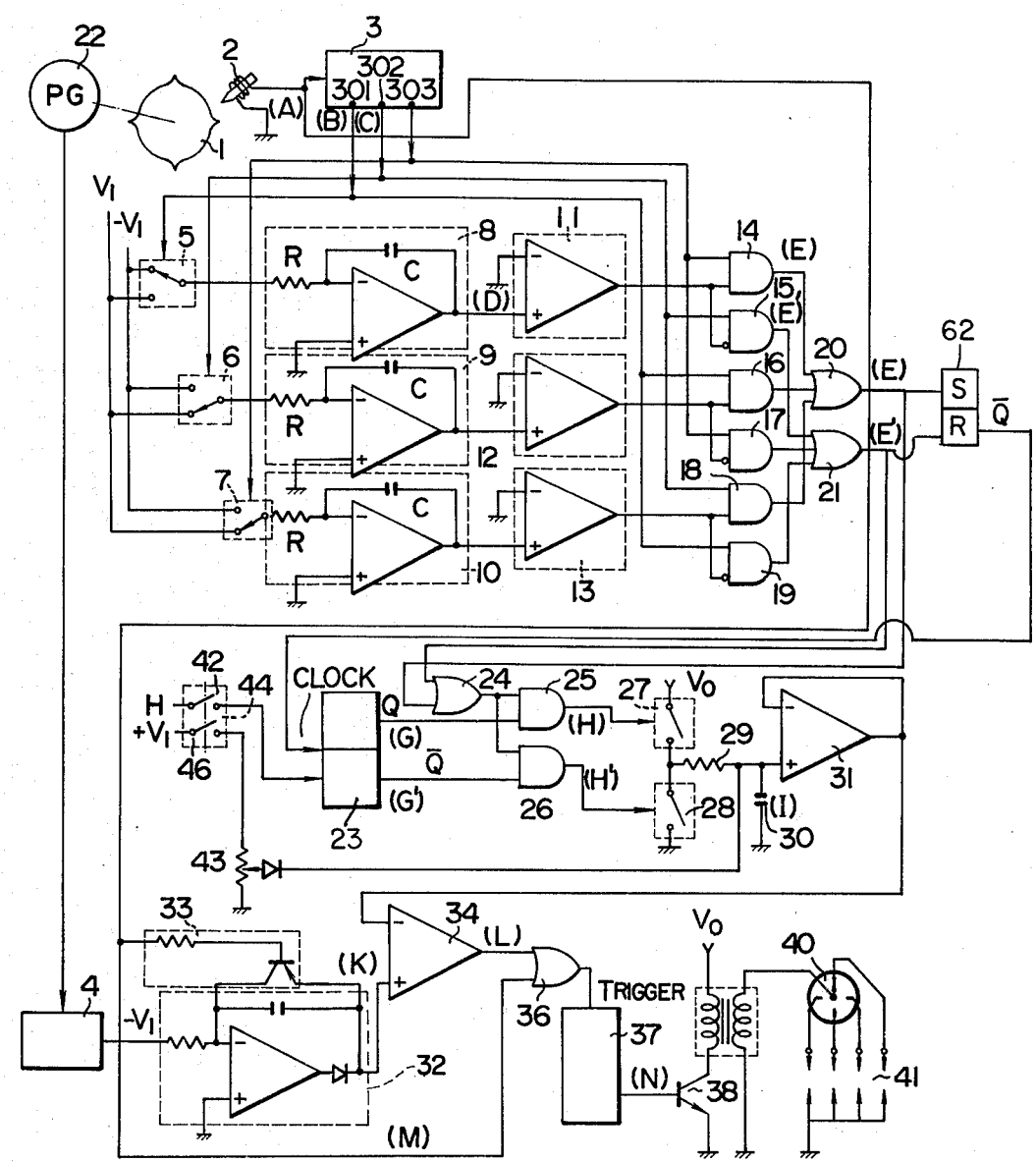
FIG. 4 is a block diagram showing a control circuit in an embodiment of the apparatus according to the present invention.

A circuit diagram showing an embodiment of the invention is shown in FIG. 4. The diagrams of 5A to 5N and FIGS. 6A to 6N show waveforms of the signals A, B, C, D, E or E', F, G or G', H or H', I, K, L and L produced at various points in the circuit of FIG. 4. Accelerated and decelerated conditions are illustrated respectively by FIGS. 5A to 5N in FIGS. 6A to 6N.

A rotor 1 rotates in synchronism with the rotation of the engine and has protrusions of a number equal to that of cylinders, at corresponding positions slightly before the dead points of the respective cylinders. A magnetic pick-up 2 produces a pulse as shown in FIG. 5A or FIG. 6A each time when any one of the protrusions of the rotor 1 is passing beside the pick-up 2. An output signal of the pick-up 2 is applied as a clock input signal to a ring counter 3. The ring counter 3 produces at one of the output terminals 301, 302 and 303 thereof a high level signal in response to each clock pulse applied thereto so that the output terminals 301, 302 and 303 are raised to high level successively in that order and this sequence is repeated with application of the pulses from the pick-up 2. The output signal B produced at the output terminal 301 is shown in FIGS. 5B and 6B, and the output signal C produced at the output terminal 302 in FIGS. 5C and 6C. (The ouput signal produced at the ouput terminal 303 is not shown.) Switch circuits 5, 6 and 7 are adapted to be actuated in response to the output signals produced at the output terminals 301, 302 and 303 respectively. When any of these output signals is at high level, the common pole of the switch circuit involved is closed at the upper contact as shown in FIG. 4. As a result, a voltage level $-V_1$ is applied to the common pole. When the output signal at low level, on the other hand, the common pole is closed at the lower contact so that a voltage $+V_1$ is applied to the common pole. Integrator circuits 8, 9 and 10, are well-known ones using an operational amplifier circuit, and produce an output D which has an amplitude expressed as $$e_0 = \frac{1}{RC} \int_0^t e_{in} dt \qquad (1)$$

where R is the resistance of a resistor attached to the inverting input terminal, C the capacity of the capacitor connected between the output terminal and the inverting input terminal, and $e_{in}$ a voltage applied through the resistor R. The waveform of the output signal D produced from the integrator circuit 8 is shown in FIG. 5D or 6D. As long as the output signal B is at high level, the input voltage of the integrator circuit 8 assumes a value $-V_1$. Thus the amplitude $e_{08}$ of the output signal D of the integrator circuit 8 undergoes the change as shown by the equation below by using "$-V_1$" for $e_{in}$ in the equation (1) assuming that the capacitor is so arranged that its initial potential is set to zero.

$$e_{08} = -\frac{1}{RC} \int_0^t (-V_1) dt = \frac{V_1}{RC} t \qquad (2)$$

Next when the ouput signal B changes to low level as shown in FIG. 5B, the switch circuit 5 is actuated again so that the input of the integrator circuit 8 changes to $V_1$. The amplitude of the output D of the integrator circuit 8 is given as $$e_{08} = \frac{V_1 T}{RC} - \frac{1}{RC} \int_0^t V_1 dt \qquad (3)$$
$$= \frac{V_1}{RC}(T-t)$$

where T is the length of time during which the output signal B is at high level. (Here, the initial point of integration is the time point when the ouput signal B is reduced to low level.) The integrators 9 and 10 also produce output signals of similar waveform in response to the outputs from the terminals 302 and 303, respectively.

Comparator circuits 11, 12 and 13 are for comparing the output signals of the integrator circuits 8, 9 and 10 with zero level, each producing a high-level or low-level signal depending on whether the amplitude $e_{08}$ of the output of the associated integrator is not smaller than zero or smaller than zero, respectively. Each of the AND gates 14, 15, 16, 17, 18 and 19 receives two input signals, one of which is an inverted or non-inverted output of one of the comparator circuits 11 to 13 and the other of which is the output produced at one of the output terminals 301, 302 and 303. The output signals from the AND gates 14, 16 and 18 are applied to the three-input OR gate 20, while output signals from the AND gates 15, 17 and 19 are applied to the three-input OR gate 21.

In the case where output intervals of the pick-up 2 are gradually shortened as shown in FIG. 5A, it indicates an accelerated condition. Under this condition, the time T during which output signal B is at high level is longer than time T' during which the output signal C is at high level, i.e., T>T'. In contrast, FIG. 6A shows the condition in which the output intervals of the pick-up 2 are gradually increased, i.e., a decelerated condition, under which T is smaller than T'.

Under the accelerated condition, the time during which $e_{08}$ is larger than zero is longer than T+T' as shown in FIG. 5D, and therefore the output signal of the AND gate impressed with the output signals of the comparator circuit 11 and the terminal 303 assumes a time-difference signal which continues for a time interval equal to T−T' as shown in FIG. 5E. The AND gate 15 which receives the inverted output of the comparator circuit 11 and the output signal C produces no output signal but the output thereof is kept at zero.

Under the decelerated condition, on the other hand, the time during which $e_{08}$ is larger than zero is shorter than T+T' as shown in FIG. 6D, and therefore the output signal of the AND gate 14 receiving the output signals of the comparator circuit 11 and the terminal 303 is zero, while the output signal of the AND gate 15 impressed with the inverted output signal of the comparator circuit 11 and the output signal C is a time-difference output signal which continues for a time interval equal to T'−T as shown in FIG. 6E'.

As noted from the foregoing description, an accelerated condition causes a time-difference output signal to be generated from the AND gate 14, while a decelerated condition generates a time-difference output signal at the output of the AND gate 15. The combinations of the other two integrator circuits 9 and 10 with the comparator circuits 12 and 13 operate similarly. The time-difference output signals produced from them are applied through the OR gate 20 under the accelerated conditions and through the OR gate 21 under the decelerated condition to further circuits. Accordingly, under the accelerated condition, an output signal of the waveform identical to that shown in FIG. 5E is produced from the OR gate 20, while under the decelerated condition, an output signal of the waveform identical to that shown in FIG. 6E' is produced from the OR gate 21. The output signal E from the OR gate 20 is applied to the set terminal of flip-flop 62 and the output signal E' from the OR gate 21 is applied to the reset terminal of the flip-flop 62. The $\bar{Q}$ output of flip-flop 62 is applied to the clock terminal of the trigger-type flip-flop 23. The trigger-type flip-flop 23 has output terminals Q and $\bar{Q}$, and assumes the condition where either Q=1 (high level) and $\bar{Q}$=0 (low level) or Q=0 and $\bar{Q}$=1. This condition is changed from one to another each time an input pulse is applied to the clock terminal because the $\bar{Q}$ output of flip-flop 23 includes an internal connection to the condition setting terminal thereof. Thus, the condition of flip-flop 23 changes each time when the engine speed changes from acceleration to decleration.

Signal waveforms of outputs Q and $\bar{Q}$ of the trigger-type flip-flop 23 are shown in FIG. 5G and FIG. 6G respectively. In both cases, it is assumed that a high-level signal is produced at the terminal Q before the time-difference signal of FIG. 5E and 6E is applied to the flip-flop 62. Outputs Q and $\bar{Q}$ of the trigger-type flip-flop 23 are applied to the inputs of the AND gates 25 and 26, respectively, which receive at other input terminals thereof the output signal of an OR gate 24 to which the output signals of the OR gates 20 and 21 are applied. As a result, the time-difference signal actuates the AND gate 25 or 26 depending on the condition of the output signal of the trigger-type flip-flop 23 thereby driving the corresponding one of the switch circuits 27 and 28. When the output Q of the trigger-type flip-flop 23 is at high level, for instance, the output signal as shown in FIG. 5H is produced from the AND gate 25, thereby driving the switch circuit 27. With the closing of the switch circuit 27, the source voltage Vo is applied through the resistor 29 to the capacitor 30 thereby to charge the same. This condition is shown in FIG. 5I. On the other hand, in case of the $\bar{Q}$ output of flip-flop 23 being at high level, the AND gate 26 produces an output signal as shown in FIG. 6H', thus driving the switch circuit 28, while the switch circuit 27 is opened with no output from the gate 25, so that the charges in the capacitor 30 are released through the resistor 29 and the switch circuit 28 thereby decreasing the voltage level of the capacitor as shown in FIG. 6I. The length of time during which the switches 27 and 28 are in operation is equal to the duration of the time-difference signal, i.e., $\Delta T$ ($=T_1-T_2$), and therefore the charge stored or released during that time is substantially proportional to $\Delta T$.

By the way, a switch device 42 is provided for setting the initial condition of the capacitor 30 and the flip-flop 23 before initiating the control cycle. The contacts 44 and 46 are closed before initiation of the control cycle, so that a high-level signal is applied through the contact 42 to the set terminal S of the flip-flop, thereby setting the outputs Q and $\bar{Q}$ at low and high levels, respectively. This condition is corresponding to the case where $K=1$. On the other hand, the capacitor 30 is charged to a predetermined level through the contact 46. As mentioned above, the potential of the capacitor 30 determines the ignition timing and the initially charged potential thereof is so selected that $\theta=0$. During the operation of the control cycle, the switch device 42 is opened. The voltage level of the capacitor 30 is applied to the comparator 34 through a buffer circuit 31 providing a high-input impedance.

The integrator circuit 32 integrates the input voltage applied thereto and produces a sawtooth waveform. This circuit includes a reset circuit 33. Since the integrator circuit 32 is reset in response to the output signal of the pick-up coil 2, the integrator circuit 32 produces an output waveform as shown in FIG. 5K or 6K. The input terminal of the integrator circuit 32 is impressed, through the monostable multivibrator 4, with an output of the pulse generator 22 which rotates in synchronism with the revolving shaft of the engine and generates one pulse for each angular movement of, for example, 0.5° of the revolving shaft. The multivibrator 4, in response to each input pulse, generates a pulse having a predetermined amplitude and a predetermined width smaller than the minimum interval of the output pulses of the pulse generator 22. The integrator circuit 32 integrates the output pulses of the monostable multivibrator 4 and therefore produces a voltage output increasing in steps. This configuration enables the maximum amplitude of the output of the integrator circuit 32 to be constant independent of the speed of the engine revolution. The maximum amplitude is selected so as to be equal to the maximum charged value of the capacitor 30 (which is corresponding to $\theta=0$). The other words, the integrator circuit 32 produces repeatedly a saw-tooth waveform signal which starts at each occurrence of the pulses shown in FIGS. 5A or 6A and terminates at occurrence of the next one of the same pulses, as shown in FIGS. 5K or 6K. The output signal of the integrator circuit 32 is compared with the output of the buffer circuit 31 at the comparator circuit 34, which, when the saw-tooth output signal exceeds the voltage across the terminals of the capacitor 30, produces an output signal as shown in FIGS. 5L or 6L. As mentioned previously, since the buffer circuit 31 provides a high input-impedance, the charge voltage thereof undergoes no substantial change as long as both the switch circuits 27 and 28 are not in operation, that is, the engine is driven at a constant speed. The output signal of the comparator circuit 34 is applied through the OR gate 36 to the monostable multivibrator 37 for triggering the same. The other input terminal of the OR gate 36 is impressed with output pulses of the pick-up 2. Consequently, the output signal shown in FIGS. 5N or 6N is produced from the monostable multivibrator 37. The monostable multivibrator 37 produces a high-level signal for a given period of time and therefore, during this period, the power transistor 38 is driven. At the time point when the power transistor 38 is turned off, current that has thus far flowed in the primary winding of the ignition coil 39 is cut off, so that a high voltage is induced in the secondary winding thereof, resulting in generation of a spark in one of the ignition plugs 41 determined by the distributor 40. In the absence of an output of the comparator circuit 34 for some reason or other, ignition is effected by the output pulses of the pick-up 2.

In the foregoing description, assume that the output Q of the trigger-type flip-flop 23 is at high level under the accelerated condition. The voltage across the capacitor 30 gradually increases so that the operation point of the comparator 34, i.e., the ignition timing is gradually delayed. If acceleration changes to deceleration, the condition of the trigger-type flip-flop 23 is reversed. The result is that the switch circuit 28 is closed for a period of time corresponding to the time difference signal, thereby reducing the voltage across the capacitor 30, resulting in shift of the ignition timing in the direction of advance. In other words, when the output Q of the trigger-type flip-flop 23 is at high level, the ignition timing is shifted in the direction of delay, while when the output $\bar{Q}$ is at high level, the ignition timing is shifted in the direction of advance. Upon detection of a decelerated condition of engine revolutions, the direction in shift of the ignition timing is reversed.

It is explained above that according to the embodiment of the invention shown in FIG. 4, ignition timing is always adjusted to keep the engine revolutions at maximum, thus achieving maximum torque operation as shown in FIG. 2. Further, practical application of the invention is facilitated by a configuration without the need of any special ignition timing characteristics program or sensor.

Figure 7:
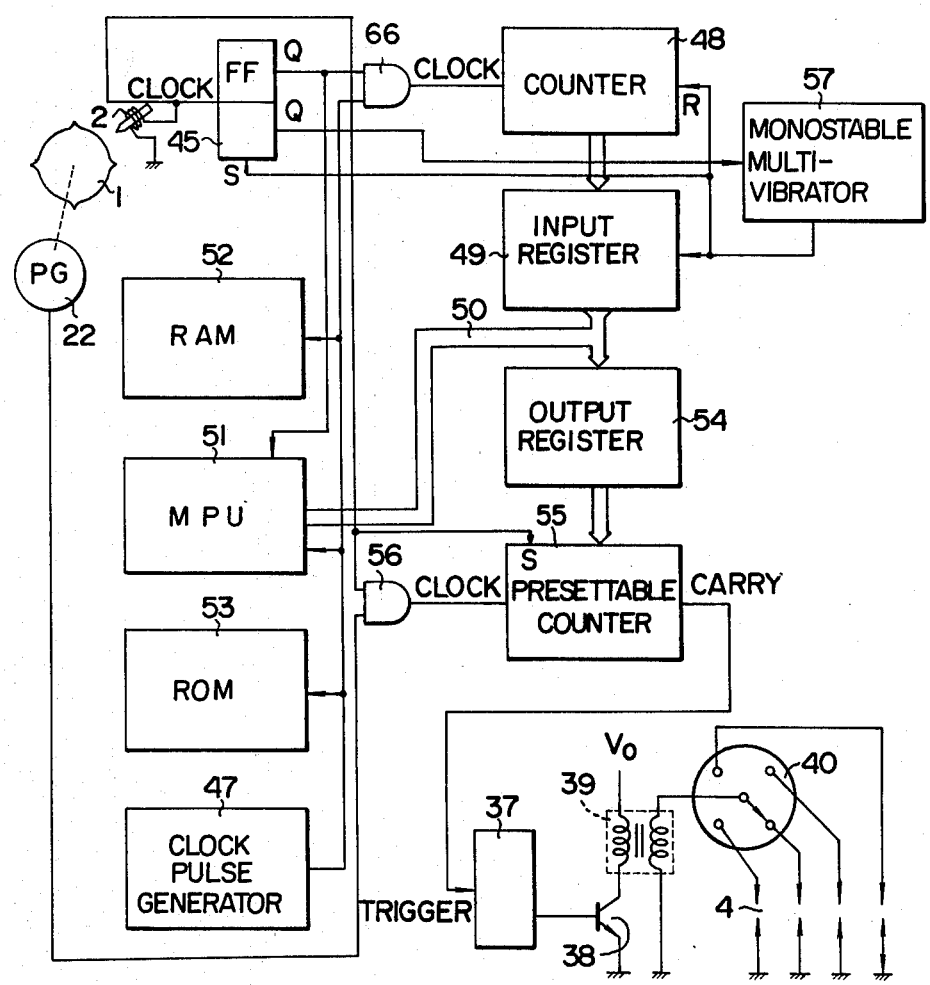
FIG. 7 is a block diagram showing the circuit of another embodiment of the apparatus according to the invention.

Another embodiment of the invention will be explained below with reference to FIG. 7. In the embodiment under consideration, the processes of operation and determination are performed by a microcomputer. In the drawing, 45 shows a trigger-type flip-flop. Like the flip-flop in FIG. 4, each time an output pulse of the pick-up 2 is applied to the clock terminal of the flip-flop 45, the output condition thereof is reversed. Assume that an output pulse of the pick-up 2 is applied to the clock terminal of the flip-flop 45, and signals of high and low levels are produced at terminals Q and $\bar{Q}$, respectively. The high-level signal at terminal Q causes the AND circuit 66 to open, so that the counter 48 begins to count the output pulses of the clock pulse generator 47 which are applied thereto through the AND circuit 66. This counting operation is terminated when the output at terminal Q of the flip-flop 45 is changed to low level in response to the next output pulse of the pick-up 2. Upon the change of the output at terminal Q to low level, the output at terminal $\bar{Q}$ goes to high level, so that the monostable multivibrator 57 is triggered and generates a single pulse after a lapse of a very short length of time as compared with the output pulse intervals of the pick-up 2. This pulse is applied to the counter 48 and the register 49, so that the count made by the counter 48 is stored in the input register 49 while at the same time resetting the counter 48. Simultaneously, the output pulse of the monostable multivibrator 57 is applied to the set terminal S' of the flip-flop 45, thereby setting the terminal Q of the same at high level. Thus, although when the terminal Q of the flip-flop 45 is reduced to low level, the gate 66 is closed and the counter 48 stops counting the clock pulses, the gate 66 opens again thereby to start the next counting immediately upon transfer of the count to the input register 49. Since the output pulse of the monostable multivibrator 57 is produced at a very short time after change of the terminal $\bar{Q}$ to low level, the count of the counter 48 is substantially identical to the number of clock pulses generated in the time intervals of the output pulses sequentially generated by the pick-up 2. Thus, the count of the counter 48 corresponds to $T_1$, $T_2$ and so on in FIG. 1.

The micro-computer unit (MPU) is connected to the input register 49 and the output register 54 through the data bus 50, and upon receipt of the information stored in the input register 49 in accordance with the program stored in the read-only memory (ROM) 53, processes the same. The result of the process is stored in the output register 54. The read-only memory 53 stores a program adaptable to cause the MPU to operate the steps according to the flow-chart of FIG. 3. The random access memory (RAM) 52 stores the data obtained by the process of the MPU to be read out when desired. The successive steps in operation of the MPU are performed at timings of the output clock pulse of the clock pulses generator 47.

The process sequence will be explained next. The addresses of the random access memory 52 are designated to store the data or information described below.

| Address | Data |
|---------|------|
| $n_1$ | $\theta$ |
| $n_2$ | K |
| $n_3$ | $T_1$ |
| $n_4$ | $T_2$ |
| $n_5$ | $\Delta T$ |

With the actuation of the circuit, $\theta = 0$ and $K = 1$ are first stored in addresses $n_1$ and $n_2$ of the random access memory, and the program counter (not shown) within MPU is set to zero corresponding to its starting position. Under this condition, the number of clock pulses generated during the interval between two successive pulses of the pick-up 2, i.e., the number corresponding to $T_1$ is counted by the counter 48 and the resulting count is transferred to the input register 49. Then, MPU 51 conducts the processes in the following steps in accordance with the ROM program:

| Step No. | Process |
|----------|---------|
| 1 | The data ($T_1$) stored in the input register 49 is written in address $n_3$ of RAM. |
| 2 | The information ($\theta$) in address $n_1$ of RAM is transferred to an output register 54. The counter 48 operates the next counting cycle (measurement of $T_2$) and then the content of the counter 48 is transferred to the register 49. During the counting operation of the counter 48 i.e., until the output Q of the flip-flop is changed to low level, the MPU may be free from any operating process relating to this control cycle. When the output Q is changed to low level, an interruption command is issued to MPU, thereby causing the MPU to start the next step. |
| 3 | The information ($T_2$) stored in the input register 49 is written in address $n_4$ of the RAM. |
| 4 | The contents stored in addresses $n_3$ and $n_4$ of RAM ($T_1$ and $T_2$) is read out and, the difference between them, i.e., $\Delta T = T_1 - T_2$ is computed, and the result is stored in address $n_5$. |
| 5 | The information at address $n_5$ of RAM is compared with the constant 0 stored in a predetermined address of ROM, and it is determined whether $\Delta T$ is smaller than zero or not. The program is set to carry out step No. 6 and then step No. 7, if $\Delta T$ is smaller than zero, while to jump to step No. 7 by omitting step No. 6 if $\Delta T \not< 0$. |
| 6 | The information (K) stored in address $n_2$ of RAM is read and compared with the constant "1" stored in a predetermined address of ROM. If $K = 1$, $K = 0$ is stored in the address $n_2$ of RAM; and if $K \neq 1$, $K = 1$ is stored in the same address. In other words, the data at address $n_2$ of RAM is reversed from 1 to 0 or from 0 to 1. |
| 7 | The constant "A" stored in a predetermined address of ROM 53 and the information ($\Delta T$) at address $n_5$ of RAM are read out, and the product thereof $|A\Delta T|$ is computed and added to when the information (K) at address $n_2$ of RAM is $K = 1$, or subtracted from when $K = 0$, the information ($\theta$) at address $n_1$ of RAM. Thus ($\theta + A\Delta T$) is computed and stored in RAM address $n_1$. In other words, the information at RAM address $n_1$ is updated from $\theta$ to ($\theta + A\Delta T$.) |
| 8 | The information ($T_2$) at RAM address $n_4$ is transferred to address $n_3$ in order to use the value $T_2$ used in the above-mentioned processing cycle as $T_1$ in the next cycle. |

After completion of step No. 8, step No. 2 is resumed, thus repeating this cycle. In this way, the initially set value for $\theta$ is corrected by $A\Delta T$ in each cycle and the updated value $\theta + A\Delta T$ is written in the output register 54 to be used to control the ignition timing The output register 54 is conncted to the presettable counter 55, so that the information stored in the register 54 is set in the presettable counter 55 in response to the pulses produced from the pick-up 2. The pulse produced from the pick-up 2 simultaneously opens the gate 56, with the result that the output pulses of the pulse generator 22 are applied through the gate 56 to the counter 55 and counted by the same to be added to the set value. The pulse generator 22 is adapted to produce a pulse for each predetermined angular movement of, for example, 0.5° of the engine shaft as that shown in FIG. 3. Assuming that the pulse generator 22 produces $n_0$ pulses during two successive output pulses of the pick-up 2, the presettable counter 55 is arranged to overflow upon counting $n_0$ pulses and generate a carry signal. Since a value corresponding to $\theta + A\Delta T$ is previously set in the counter 55, the carry signal is generated when the number of pulses generated by the pulse generator 22 reaches $n_0 - (\theta + A\Delta T)$, which occurs at $\theta + A\Delta T$ in advance of occurrence of the next pulse generated by the pick-up 2. This carry signal triggers the monostable multivibrator 37 thereby to effect each ignition in a manner similar to that explained with reference to FIG. 3.

It will thus be understood that according to the present invention, means are provided to automatically detect whether the engine rotating speed is accelerated or decelerated and also the magnitude of acceleration or deceleration of the same and the direction and amount in shift of the ignition timing are determined according to the results of the detection. Regardless of variations in the engine characteristics, fuel consumption, environmental conditions, etc., therefore, the engine is conditioned to produce its maximum torque under the given fuel supply, resulting in saving of fuel cost.

I claim:

1. A method for enabling automatic control of the ignition timing of an internal combustion engine, comprising the steps of detecting whether the engine speed is accelerating or decelerating and the magnitude of the acceleration or deceleration, generating a signal indicative of the acceleration or deceleration and the magnitude thereof, determining the direction and amount in shift of the ignition timing in response to the signal generated according to the results of each detection, and generating a signal indicative of the direction and amount in shift of the ignition timing for enabling automatic control of the ignition timing.

2. A method according to claim 1, comprising the steps of storing information representing ignition timing and direction of shifting of the ignition timing, determining the direction of shifting to be the same as the direction represented by the previously stored information when an accelerated condition of the engine speed is detected, and to be opposite to the direction represented by the previously stored information when a decelerated condition of the engine speed is detected, and updating the previously stored information.

3. A method according to claim 2, comprising the steps of setting an initial timing at which the first ignition is to be effected and an initial direction to which the first shift of the ignition timing is to be effected, storing information representing the set initial ignition timing and the set initial direction of shifting of the ignition timing, and updating the stored information concerning the direction of shifting of the ignition timing to that representing the direction of shifting determined in accordance with the step of detecting, the step of setting being carried out prior to the detecting step.

4. A method according to claim 1, comprising steps of setting an initial ignition timing at which the first ignition is to be effected and an initial direction to which the first shift of the ignition timing is to be effected, said setting step being carried out prior to said detecting step, and changing the ignition timing by shifting it to the direction determined by each detection in said detecting step.

5. A method according to claim 4, in which when an accelerated condition of the engine speed is detected, the direction in shift of the ignition timing is updated to the same direction as that set immediately before, and when a decelerated condition of the engine speed is detected, the direction in shift of the ignition timing is updated to the opposite direction.

6. A method according to claim 4, in which said initial ignition timing is set at the most delayed time point in a predetermined range of shifting the ignition timing, and said initial direction of shifting is set to the direction of advancing the ignition timing.

7. A method according to claim 1, in which said detecting step is effected by comparing two successive time intervals with each other, each of said two successive time intervals being a time interval required for the rotating shaft of the engine to rotate a predetermined angle.

8. A method according to claim 7, wherein the step of determining includes determining the amount by which said ignition timing is to be shifted as a function of the difference between said two successive time intervals.

9. An apparatus for enabling control of the ignition timing of an internal combustion engine, comprising means for detecting whether the engine speed is accelerating or decelerating and the magnitude of the acceleration or deceleration, said detecting means generating a signal indicative of the acceleration or deceleration and the magnitude thereof, and means for determining the direction and amount in shift of the ignition timing in response to the signal generated by said detecting means according to the results of each detection by said detecting means, said shift-direction determining means generating a signal indicative of the direction and amount in shift of the ignition timing for enabling control of the ignition timing.

10. An apparatus according to claim 9, comprising means for storing information representing ignition timing and direction of shifting of the ignition timing, said shift-direction determining means determining the direction to be the same as the direction represented by the content previously stored in the storing means when said detecting means detects an accelerated condition of the engine speed, and to be opposite to the direction represented by the content previously stored in said storing means when said detecting means detects a decelerated condition of the engine speed.

11. An apparatus according to claim 10, comprising means for setting an initial ignition timing at which the first ignition is to be effected and an initial direction to which the first shift of the ignition timing is to be effected, said storing means storing information representing the initial timing and the initial direction of shifting of the ignition timing, and means for changing the content of the storing means concerning the direction of shifting of the ignition timing to that representing the direction of shifting determined by said shift-direction determining means, and means for shifting the ignition timing in the direction represented by the contents stored in said storing means.

12. An apparatus according to claim 9, further comprising means for setting an initial ignition timing at which the first ignition is to be effected and an initial direction to which the first shift of the ignition timing is to be effected, means for storing information representing said initial ignition timing and said initial direction of shifting the ignition timing, means for changing the content of said storing means concerning the direction of shifting the ignition timing to that representing the direction of shifting determined by said shift-direction determining means, and means for shifting the ignition timing predetermined amount in the direction represented by the content stored in said storing means.

13. An apparatus according to claim 12, in which said shift-direction determining means determines the direction to be the same as the direction represented by the content just stored in said storing means when said detecting means detects an accelerated condition of the engine speed, and to be opposite to the direction represented by the content just stored in said storing means when said detector means detects a decelerated condition of the engine speed.

14. An apparatus according to claim 12, in which said setting means sets said initial ignition point at the most delayed point in a predetermined range of shifting the ignition timing, and sets said initial direction of shifting to the direction of advancing the ignition timing.

15. An apparatus according to claim 12, in which said detecting means includes means for generating a pulse each time the engine rotating shaft rotates a predetermined angle, means for successively detecting the time intervals between adjacent two of said pulses, and means for comparing successive two of said time intervals with each other.

16. An apparatus according to claim 15, in which said comparator means includes means for detecting the difference between two successive time intervals, said determining means determining the amount in shift of the ignition timing as a function of said difference, and said means for shifting the ignition timing shifting the ignition timing in accordance with the determined amount.

* * * * *